United States Patent
Ireland et al.

(10) Patent No.: US 9,207,054 B2
(45) Date of Patent: Dec. 8, 2015

(54) SOLID STATE IGNITION SAFETY DEVICE

(71) Applicant: BAE Systems Land & Armaments, L.P., Santa Clara, CA (US)

(72) Inventors: Jeffrey V. Ireland, Rosemount, MN (US); James A. Luoma, Maple Grove, MN (US); Robert V. Mortensen, Andover, MN (US); James M. Anderson, Cedar, MN (US)

(73) Assignee: BAE Systems Land & Armaments L.P., Santa Clara, CA (US)

( * ) Notice: Subject to any disclaimer, the term of this patent is extended or adjusted under 35 U.S.C. 154(b) by 409 days.

(21) Appl. No.: 13/799,589

(22) Filed: Mar. 13, 2013

(65) Prior Publication Data

US 2015/0241189 A1    Aug. 27, 2015

Related U.S. Application Data

(60) Provisional application No. 61/651,967, filed on May 25, 2012.

(51) Int. Cl.
*F42B 15/10* (2006.01)
*F42C 11/06* (2006.01)
*F42B 15/36* (2006.01)
*F42C 11/02* (2006.01)

(52) U.S. Cl.
CPC .............. *F42C 11/065* (2013.01); *F42B 15/36* (2013.01); *F42C 11/02* (2013.01)

(58) Field of Classification Search
CPC ......... F42C 11/02; F42C 11/06; F42C 11/065
See application file for complete search history.

(56) References Cited

U.S. PATENT DOCUMENTS

| | | | | |
|---|---|---|---|---|
| 3,324,317 A * | 6/1967 | Hazelet | ........................ | 310/329 |
| 3,359,904 A * | 12/1967 | Nerheim | ....................... | 102/210 |
| 3,389,275 A * | 6/1968 | Brothers | ....................... | 310/329 |
| 3,941,058 A * | 3/1976 | Gawlick et al. | ............... | 102/210 |
| 4,141,298 A * | 2/1979 | Weidner | ........................ | 102/210 |
| 5,022,324 A * | 6/1991 | Rice, Jr. | ........................ | 102/201 |
| 5,157,220 A | 10/1992 | Schaffhauser et al. | | |
| 5,444,598 A | 8/1995 | Aresco | | |
| 5,485,786 A | 1/1996 | Hesse et al. | | |
| 5,536,990 A * | 7/1996 | Nelson | ........................ | 310/339 |
| 7,565,795 B1 * | 7/2009 | Horn et al. | .................... | 60/200.1 |
| 2005/0178282 A1 | 8/2005 | Brooks et al. | | |

(Continued)

FOREIGN PATENT DOCUMENTS

GB        1361168 A *   7/1974 .............. F42C 11/02

OTHER PUBLICATIONS

International Preliminary Report on Patentability from PCT Application PCT/US2013/042370, dated Dec. 4, 2014, 7 pgs.

(Continued)

*Primary Examiner* — Gabriel Klein
(74) *Attorney, Agent, or Firm* — Patterson Thuente Pedersen, P.A.

(57) ABSTRACT

A solid state ignition safety device for rocket assisted projectiles having a piezoelectric generator that charges a capacitor during the initial acceleration of the projectile by the launching propellant charge. The capacitor is then discharged after a delay to ignite an initiator, which ignites the rocket motor of the projectile. A time delay circuit can be integrated into the ignition safety device to further delay the ignition of the initiator until the projectile has reached the ideal point in its trajectory to ignite the rocket motor.

14 Claims, 4 Drawing Sheets

(56) References Cited

U.S. PATENT DOCUMENTS

2009/0013891 A1* 1/2009 Rastegar et al. .............. 102/210
2011/0226149 A1* 9/2011 Tepe et al. .................... 102/376
2012/0012020 A1 1/2012 Remahl

OTHER PUBLICATIONS

International Search Report and Written Opinion from PCT Application PCT/US2013/042370, dated Aug. 13, 2013, 10 pgs.

* cited by examiner

SOLID STATE IGNITION SAFETY DEVICE

RELATED APPLICATIONS

The present invention claims the benefit of U.S. Provisional Application No. 61/651,967, filed May 25, 2012, and incorporated herein in its entirety by reference.

FIELD OF THE INVENTION

The present invention is directed to a solid state ignition safety device ("ISD") for controlling ignition of rocket motors for rocket assisted projectiles. More specifically, the present invention is directed to a solid state ISD for controlling the delayed ignition of the rocket motor for rocket assisted projectiles that are gun launched prior to the ignition of the rocket motor.

BACKGROUND OF THE INVENTION

Rocket assisted projectiles are artillery or cannon fired projectiles that have an integrated rocket motor for extending the effective range of the projectile. Conventional artillery or cannon projectiles rely solely on the gases generated from the ignited propellant charge to propel the projectile to the intended target. With rocket assisted projectiles, a propellant charge is used to eject the projectile from the barrel of a mortar or cannon before the rocket motor is ignited to propel the projectile to the target. The rocket motor can serve as the primary means of conveying the projectile to the target or supplement the propellant charge. Rocket assisted projectiles can often also include adjustable vanes and Guidance, Navigation and Control (GNC) systems that can be operated in conjunction with the rocket motor to guide the projectile to the target increasing the accuracy of the projectiles.

Rocket assisted projectiles are initially launched by a propellant charge that propels the projectile at least clear of the barrel muzzle before the rocket motor is ignited. The timing of the ignition of the rocket motor is critical to the safe and effective operation of the projectile. If the rocket motor ignites too early, while the projectile is still travelling down the barrel, the combined propellant gases from the ignited propellant charge and rocket motor can overpressure the barrel possibly deforming and even rupturing the barrel. Similarly, if the rocket motor ignites too late, the projectile may no longer be properly oriented or too late in its flight for the rocket motor to be effective. In addition, the propellant charge for rocket assisted projectiles is often smaller than conventional propellant charges for similarly sized projectiles as the propellant charge is often only used to eject the projectile from the barrel and the primary source of propellant is the rocket motor. If the rocket motor ignites too late or fails to ignite, the projectile may hit the ground near the artillery or cannon prior to the rocket motor being ignited and potentially detonate or otherwise cause undesired harm.

Accordingly, the ignition system for the rocket motor must consistently ignite the rocket motor at the proper time following the firing of the projectile. In addition, the ignition system must be shelf stable as the projectile may be stockpiled for years and possibly even decades before the projectile is actually fired. A common timing mechanism is an elongated pyrotechnic chain linking the propellant charge with the rocket motor. The pyrotechnic chain is ignited at one end when the propellant charge is ignited. The pyrotechnic chain burns along the chain and ignites the rocket motor when the pyrotechnic chain is burned through. Overtime, the chemicals in the chain can break down or impurities can be introduced into the chain affecting the rate at which the chain burns and correspondingly altering the timing of the ignition of the rocket motor. In addition, the chain may be inadvertently ignited at a point along the chain rather than at the end causing the rocket motor to be ignited earlier than if the chain were properly ignited at the end.

A similar timing mechanism is a battery powered electrical circuit with an electronic timer that ignites the rocket motor at the predetermined time. However, if the timing mechanism malfunctions, the circuit can prematurely discharge, igniting the rocket motor. Similarly, the batteries can lose charge over time such that the igniter discharge is insufficient to ignite rocket motor. As such, battery powered timing and igniters require substantial and regular maintenance to ensure the ignition system is operating properly after extended storage.

As such, there is a need for shelf stable means of igniting the rocket motor of rocket assisted projectiles that will not degrade over time or require substantial maintenance.

SUMMARY OF THE INVENTION

The present invention is directed to a "solid state" ISD for controlling the ignition of the rocket motor for rocket assisted projectiles that are initially launched by a propellant charge. The ISD comprises a piezoelectric stack generator compressible by forces acting on the stack generator as the projectile is accelerated by the ignition of the propellant charge. The compression of the stack generator creates power that is supplied to a primary timing circuit containing a primary capacitor that is charged by the power created through the compression of the stack generator. The stored charge can then be discharged to ignite an energetic initiator positioned to then immediately ignite the fuel source for the rocket motor. The primary timing circuit also contains a primary resistor preventing the capacitor from discharging until the capacitor is charged to at least a threshold voltage corresponding to the voltage generated by the stack generator when the projectile has reached a predetermined momentum. In one aspect, the piezoelectric generator can be set to charge the primary capacitor only when the momentum of the projectile exceeds a threshold momentum to filter out relatively small movements of the projectile such as those from handling or transport of the projectile.

Replacing the prior art pyrotechnic timing delay column of the rocket assisted projectile with a resistor-capacitor (RC) electronic timing circuit removed a potentially dangerous energetic component from the projectile thus making it safer and more reliable. The piezoelectric power generator has no moving parts thus improving reliability, simplicity and cost. There is no need for stored electrical energy within the munition as energy is produced upon firing. Likewise, the present invention does not require a software module which eliminates a large potential source for failure.

In one aspect, the charging time constant of the primary capacitor can be selected to correspond to the rate of acceleration of the projectile within the barrel and the time necessary for the projectile to reach its maximum momentum. The charging rate serves as a filter to prevent charging and subsequent discharge of the primary capacitor when the projectile has accelerated to over the threshold momentum from movements other than firing such as being dropped.

In one aspect, the ISD can also comprise a timing delay circuit to delay the discharge of the primary capacitor from reaching the initiator for a predetermined period of time after the primary capacitor has been charged to at least the predetermined voltage. Depending on the size of the propellant charge, the projectile can reach its maximum momentum and correspondingly the maximum possible voltage in the capacitor prior to the projectile exiting the muzzle of the barrel causing the primary capacitor to discharge and ignite rocket motor. The delay circuit comprises at least one secondary capacitor and at least one secondary resistor selected to define a capacitor discharge time constant that sets the time delay for discharging the primary capacitor. The secondary capacitor begins to be charged by the primary capacitor once the primary capacitor exceeds the voltage threshold imposed by the primary resistor. In the same fashion, the secondary resistor delays the discharge of the secondary capacitor until it reaches a second voltage threshold, which effectively delays the ignition of the initiator. In various aspects, different combinations of secondary capacitors and secondary resistors can be varied to change the time constant and correspondingly the time delay.

A rocket assisted projectile, according to an embodiment of the present invention, comprises a projectile body, a propellant charge, a rocket motor and an ISD having an energetic initiator for igniting the rocket motor. The ISD further comprises a piezoelectric generator, a primary capacitor and a primary resistor.

In operation, the propellant charge is ignited to propel the projectile down the barrel of the weapon to a predetermined momentum, wherein the acceleration of the projectile compresses the piezoelectric generator to create a current to charge the primary capacitor. The primary resistor prevents the primary capacitor from discharging the stored energy until a predetermined voltage is reached at which point the energy is discharged from the primary capacitor to the initiator so as to ignite the initiator. In one aspect, the ISD can further comprise a timing delay circuit having a secondary capacitor and a secondary resistor for delaying the discharge of the primary capacitor from reaching the initiator for a predetermined period of time. The initiator is positioned proximate to the rocket motor such that the ignition of the initiator ignites the rocket motor to further propel the projectile.

A method of timed ignition of a rocket motor for a rocket assisted projectile, according to an embodiment of the present invention, comprises providing a piezoelectric stack generator compressible by the initial acceleration of the projectile from a propellant charge to generate power. The method further comprises charging a primary capacitor with the power generated by the stack generator, wherein a primary resistor prevents the primary capacitor from discharging until the capacitor charge exceeds a predetermined voltage threshold defined by the resistor. In one aspect, the predetermined voltage threshold corresponds to the amount of charge generated by the acceleration of the projectile nearly reaching the maximum possible momentum from the propellant charge. The method further comprises discharging the capacitor when the charge exceeds the predetermined voltage threshold to ignite an initiator positioned proximate to the rocket motor. In one aspect, the method can further comprise charging a secondary capacitor with the energy discharged from the primary capacitor upon exceeding the voltage threshold defined by the primary resistor. In this configuration, the method can also comprise preventing discharge of the primary capacitor with a secondary resistor until the secondary capacitor exceeds a voltage threshold defined by the secondary capacitor to introduce a delay between the discharge of the primary capacitor and the ignition of the initiator.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which.

Figure 1:
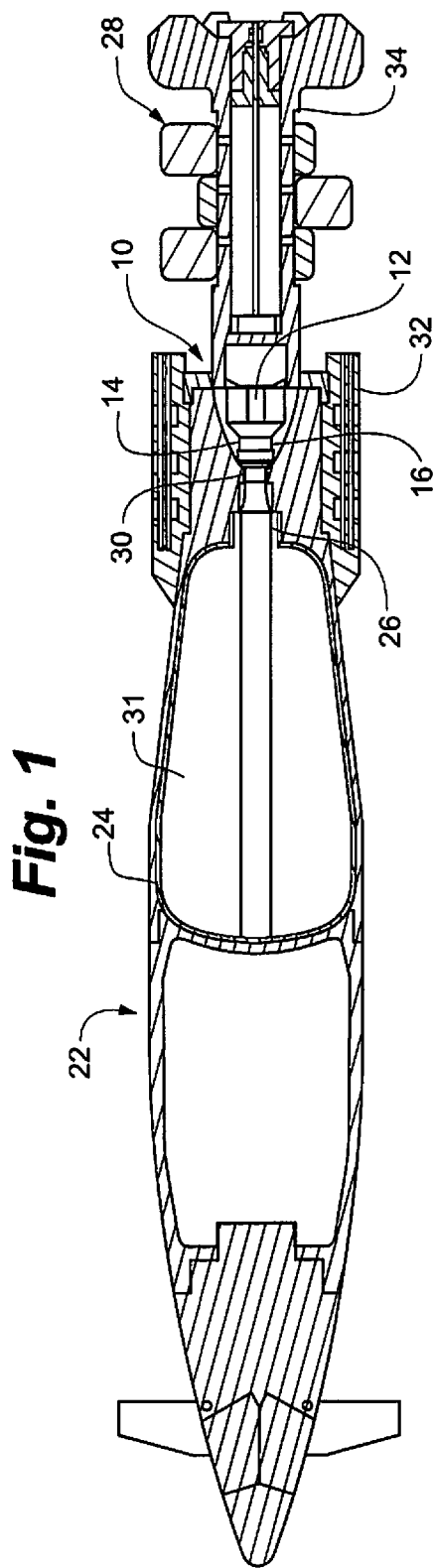
FIG. 1 is a cross-sectional side view of an ISD in a mortar projectile according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Figure 2:
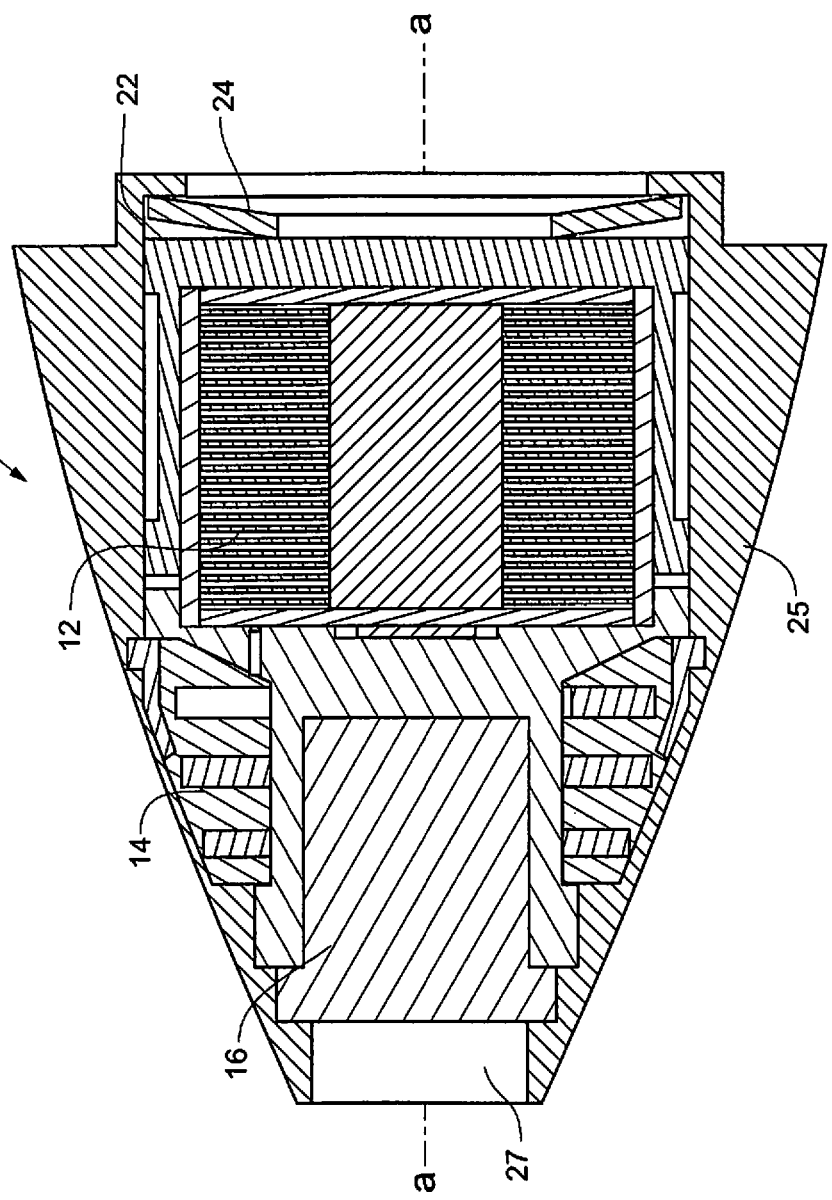
FIG. 2 is a cross-sectional side view of an ISD according to an embodiment of the present invention.
Figure 3:
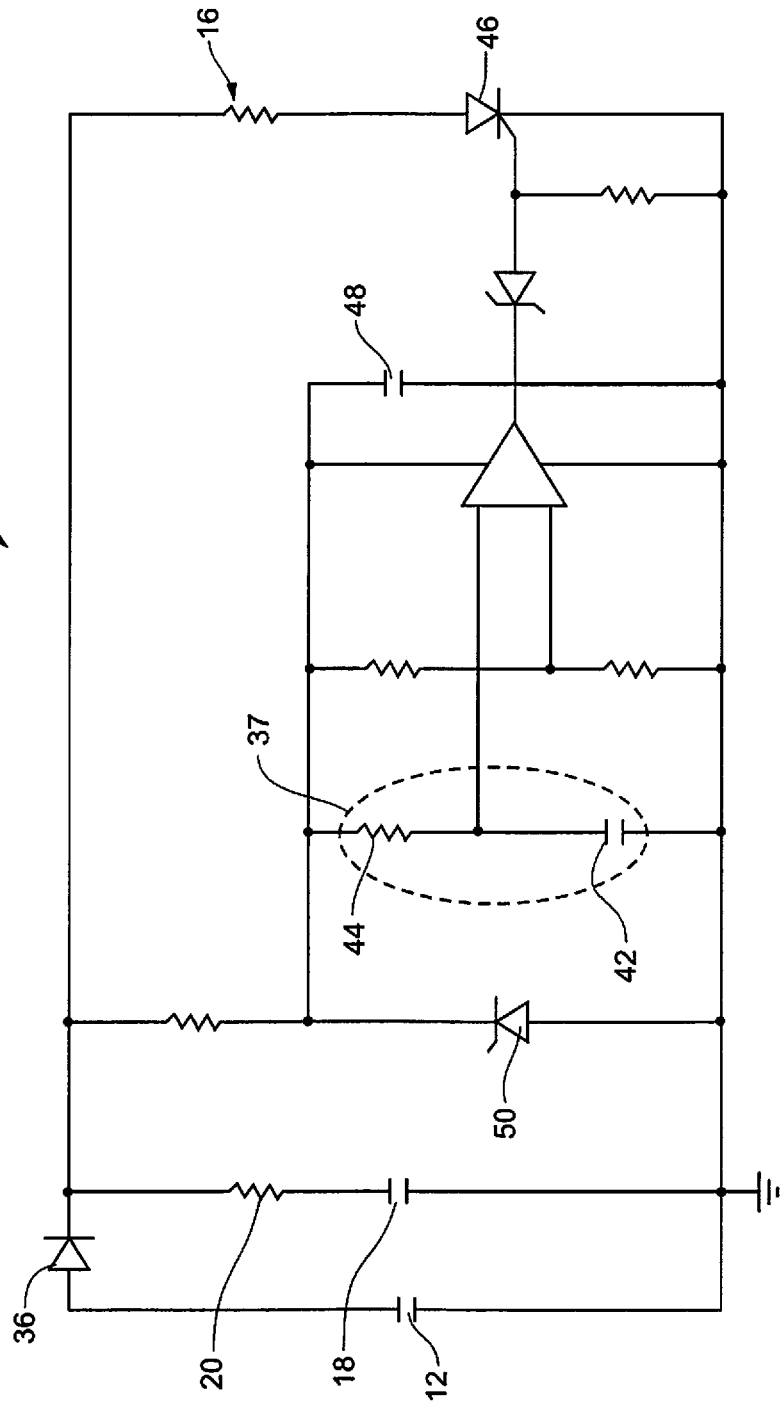
FIG. 3 is a circuit diagram of an ISD according to an embodiment of the present invention.

As shown in FIGS. 1-3, an ISD 10, according to an embodiment of the present invention, includes a piezoelectric stack generator 12, a primary firing/timing circuit 14 and an intiator 16. The primary firing/timing circuit 14 further comprises a primary capacitor 18 and a primary resistor 20. The initiator 16 comprises an energetic material that can be ignited by a high energy discharge. In one aspect, the initiator 16 is MIL-STD-1901A compliant. The initiator 16 may be similar to the Reynolds Systems, Inc., RSI-309 Exploding Foil Deflagrating Initiator. The initiator comprises an energetic material such as but not limited to boron potassium nitrate ($BNO_3$), that can be ignited by a high energy discharge exceeding 500V. In operation, piezoelectric stack generator 12 is compressible along a compression axis a-a [See FIG. 2] that extends generally down the center-line of the projectile from nose to tail to generate power, which is then supplied to the primary capacitor 18. The primary resistor 20 prevents the discharge of the energy from the stack generator 12 stored in the primary capacitor 18 until the voltage exceeds a predetermined voltage threshold. In one aspect, primary resistor 20 is rated to prevent discharge of energy from the primary capacitor 18 until the charge exceeds 500V. The discharged energy from the primary capacitor 18 is then supplied to the initiator 16 to ignite the initiator 16. The rate of power supplied to capacitor 18 corresponds to the amount of compressive force and the duration of the force applied on the compression axis a-a. As such, the time period required for charging the capacitor 18 above the voltage threshold and subsequent ignition of initiator 16 depends on the compressive forces acting on the piezoelectric generator 12. As shown in FIG. 2, in one aspect, ISD 10 can further comprise an intensifier piston 22 and a pre-loaded Belleville spring 24. It is envisioned that conical spring washers, disc springs or other compression means may be used as well. The piezoelectric stack generator 12 is positioned forward [toward the nose of the projectile] of the piston 22 which in turn is positioned on the spring 24. The piston 22 has a larger area than the piezoelectric stack generator 12 so that combined with spring 24 enhances the compressive force applied to the piezoelectric stack generator 12 when the ISD 10 is accelerated.

As shown in FIG. 2, the ISD 10 can be contained within a housing 25 defining an opening 27. The opening 27 is close relation to the rocket motor 26. The initiator 16 is oriented within the housing 25 such that the energy from the ignition will be directed through the opening 27 to the rocket motor 26. In one aspect, the housing 25 has a generally frusto-conical shape so as to fit within the rocket motor nozzle 30.

As shown in FIG. 1, a rocket assisted projectile 22, according to an embodiment of the present invention, comprises a projectile body 24, a rocket motor 26, an initial propellant charge 28 and the ISD 10. The rocket motor 26 further comprises at least one rocket nozzle 30. The initiator 16 is positioned proximate to the opening of the nozzle 30 to ignite the rocket propellant 31 within the motor 26 through the opening when the ISD 10 is triggered. In one aspect, igniting the motor 26 builds pressure within the rocket motor, thus causing a retainer holding the ISD 10 in place to fail. The ISD 10 is thus ejected from the projectile 22.

As depicted in FIG. 1, the projectile 22 is a 120 mm mortar round and further comprises a tail section 34 engaged to the aft end of the mortar projectile body 24. In this configuration, the initial propellant charge 28 is wrapped around the tail portion 34 as with a conventional mortar round. In one aspect, the tail portion 34 can separate from the projectile body 24 with the IDS 10 when the rocket motor 26 fires.

Figure 4:
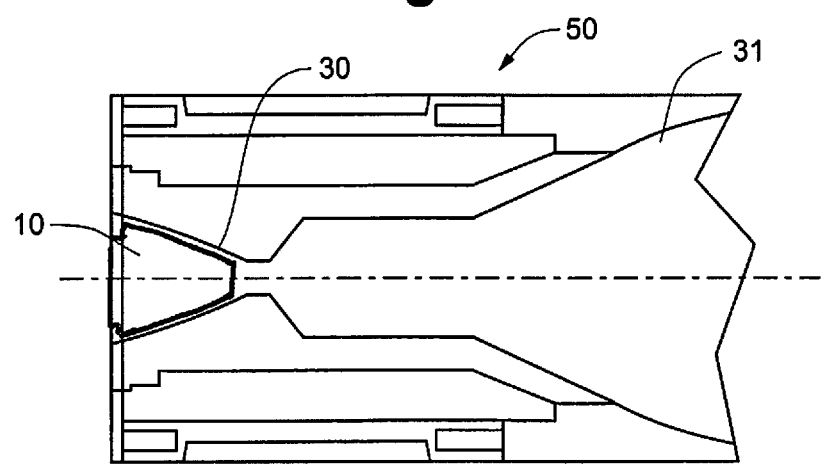
FIG. 4 is a partial cross-sectional view of a rocket assisted projectile having an ISD according to another embodiment of the present invention.

The description of the type of projectile 22 is not intended to be limiting. The ISD 10 is intended to be used with any rocket assisted projectile 22 in which the projectile 22 is initially propelled by an initial propellant charge from a gun barrel or tube launcher before a rocket motor 26 is ignited to serve as a "second stage" for further propelling the projectile 22. FIG. 4 depicts the ISD 10 as disposed in the aft section of an artillery round 50.

In operation, the propellant charge 28 is ignited to initially accelerate the projectile 22 through the barrel or tube launcher. The acceleration of the projectile 22 compresses the piezoelectric stack 12 creating power and charging the primary capacitor 18. Upon reaching the predetermined voltage threshold defined by the primary resistor 20, the primary capacitor 18 discharges igniting the initiator 16 that in turn ignites the rocket motor 26.

In one aspect, the capacitor charging time constant of the primary resistor 20 is selected to correspond to the conventional acceleration profile of an equivalent conventional projectile from the launching system such that the primary capacitor 18 exceeds the voltage threshold at least after the projectile 22 has cleared the muzzle of the barrel or tube launcher. The tailored capacitor charging time constant also provides an added safety benefit of requiring that the projectile 22 be accelerated at a specific rate and duration corresponding to launching of the projectile from the propellant charge 28. The charging time constant acts as a filter preventing charging of the primary capacitor 18 from other movements of the projectile such as handling and transport or being dropped by accident. In addition, the charging time constant prevents charging of the primary capacitor 18 when the projectile 22 is dropped down the mortar tube and only begins to charge the primary capacitor 18 when the propellant charge 28 is ignited and accelerates the projectile 22.

As shown in the circuit diagram of FIG. 3, in another embodiment, the ISD 10 further comprises a charging/timing delay/firing circuit 40 that delays the discharge of the primary capacitor 18 from reaching the initiator 16 for a predetermined time delay beginning when the capacitor 18 reaches the voltage threshold and/or when the projectile 22 reaches its maximum acceleration from propellant charge 28. The circuit 40 further comprises at least one secondary capacitor 42, at least one secondary resistor 44 and at least one diode 36 for isolating the primary and secondary capacitors 18, 42. The secondary capacitor 42 is charged by the primary capacitor 18 upon exceeding the voltage threshold imposed by the primary resistor 20. The capacitor charging time constant of the secondary capacitor 42 can be selected to define a specific time necessary to charge the secondary capacitor 42 and accordingly the delay time before the initiator 16 is ignited. In addition, the discharge of the secondary capacitor 42 is also delayed by the secondary resistor 44 until exceeding a second voltage threshold imposed by the secondary resistor 44. The secondary capacitor 42 and resistor 44 can be selected and arranged to provide the desired predetermined time delay.

The primary capacitor 18, secondary capacitor 42 and the SCR load capacitor 48 are isolated by diodes 36 and 50 so that capacitors do not discharge after maximum chamber pressure is reached and the pressure profile starts to decay causing the piezoelectric stack 12 to unload. The $T_0$ of the timing delay circuit 37 starts when max base pressure is reached which also coincides with the peak charge voltage stored in the primary capacitor 18.

The timing delay circuit 37 is a subset of circuit 40, including secondary capacitor 42 and resistor 44. This combination defines the capacitor discharge time constant and is ultimately used to set the rocket motor delay time. Thus the rocket motor delay time can be easily adjusted by modifying the resistor-capacitor combination of the time delay circuit 31.

The energy stored in the primary capacitor 18 is used to fire the initiator 16 as well as charge the time delay capacitor 42 and the SCR load capacitor 48. The ISD 10 works with very small amounts of energy and yet has to operate above 500V and output high current levels to fire the initiator 16. The SCR 46 triggers extremely fast allowing a rapid discharge of primary capacitor 18.

A method of timed ignition of a rocket motor 26 for a rocket assisted projectile 22, according to an embodiment of the present invention, comprises providing a piezoelectric stack generator 12 compressible by the initial acceleration of the projectile 22 from a propellant charge 28 to generate power. The method further comprises charging a primary capacitor 18 with the power generated by the stack generator 12, wherein a primary resistor 20 prevents the primary capacitor 18 from discharging until the capacitor 18 charge exceeds a predetermined voltage threshold defined by the resistor 20. In one aspect, the predetermined voltage threshold corresponds to the amount of charge generated by the acceleration of the projectile 22 nearly reaching the maximum possible momentum from the propellant charge 28. The method further comprises discharging the capacitor 18 when the charge exceeds the predetermined voltage threshold to ignite an initiator 16 positioned proximate to the rocket motor 26. In one aspect, the method can further comprise charging a secondary capacitor 42 with the energy discharged from the primary capacitor 18 upon exceeding the voltage threshold defined by the primary resistor 20. In this configuration, the method can also comprise preventing discharge of the primary capacitor 18 with a secondary resistor 44 until the secondary capacitor 42 exceeds a voltage threshold defined by the secondary capacitor 42 to introduce a delay between the discharge of the primary capacitor 18 and the ignition of the initiator 16.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. An ignition safety device for a rocket assisted projectile, the ignition safety device comprising:
    a piezoelectric generator disposed within an ignition safety device housing of the rocket assisted projectile;
    a primary capacitor operably connected to the piezoelectric generator;
    a primary resistor disposed electrically between the primary capacitor and an energetic initiator configured to ignite a rocket motor;
    wherein the piezoelectric generator charges the primary capacitor when subjected to launch accelerations; and
    wherein the primary resistor is configured to prevent discharge of the primary capacitor until a charge of the primary capacitor exceeds a predetermined voltage threshold.

2. The ignition safety device of claim 1 further including a spring, said spring disposed to maintain the piezoelectric generator in a state of compression.

3. The ignition safety device of claim 2 wherein the spring is a Belleville spring.

4. The ignition safety device of claim 2 further including an intensifier piston on which the piezolelectric generator in disposed.

5. The ignition safety device of claim 4 wherein the intensifier piston is disposed between the piezoelectric generator and the Belleville spring.

6. The ignition safety device of claim 1 further including a timing circuit, said timing circuit sized to set a rocket motor delay time for activating the energetic initiator.

7. The ignition safety device of claim 6 wherein the timing circuit is comprised of a resistor-capacitor combination.

8. The ignition safety device of claim 1 wherein the ignition safety device housing is mounted within a nozzle exit cone of the rocket assisted projectile.

9. The ignition safety device of claim 8 wherein the ignition safety device housing defines an opening so that the initiator is oriented within the housing such that the energy from ignition will be directed through the opening.

10. The ignition safety device of claim 1 wherein the initiator comprises an energetic material that can be ignited by a high energy discharge exceeding 500V.

11. The ignition safety device of claim 10 wherein the energetic material is boron potassium nitrate ($BNO_3$).

12. The ignition safety device of claim 1 wherein the rocket assisted projectile is a mortar launched projectile.

13. The ignition safety device of claim 1 wherein the rocket assisted projectile is a gun launched projectile.

14. The ignition safety device of claim 1 wherein the ignition safety device does not require an external power source.

* * * * *